Aug. 23, 1960 H. M. MARTIN 2,950,045

COMBINED STATEMENT AND RETURN ENVELOPE

Filed June 4, 1958

INVENTOR.
BY HUGH M. MARTIN
Richard von K. Bruna
Atty.

United States Patent Office 2,950,045

Patented Aug. 23, 1960

1

2,950,045

COMBINED STATEMENT AND RETURN ENVELOPE

Hugh M. Martin, North Syracuse, N.Y., assignor of fifty percent to Francis C. Hunt, Syracuse, N.Y.

Filed June 4, 1958, Ser. No. 739,762

1 Claim. (Cl. 229—92.3)

This invention relates generally to commercial forms, and has particular reference to business statements of the type that are mailed monthly by a billing or credit department of a store to render statements of account to its customers.

In most conventional statement forms in use at the present time, the form is divided into a statement of account section and a heading section on which the store imprints the customer's name and address as the latter is carried on its books. These sections are usually joined along a perforated or weakened tear line and for mailing, the statement is folded on this line and positioned in a window envelope so that the name and address on the heading section are in registry with the window. When paying the bill, the customer is supposed to separate the sections of the statement at the tear line, retain the statement section for his own records and reurn the heading section with his payment so that the store will have positive identification of the account to be credited.

Unfortunately, the above described system, while perfectly operable from a theoretical standpoint, does not take into account the human element which causes many customers to fail to return the heading section with their payments or to put a legible return address on the envelopes they use for mailing. This means that the store personnel has the difficult and at times almost impossible task of deciphering names on checks and, even when the writing is legible, of determining which "Smith" or "Jones" account should be credited with the remittance. Moreover, in spite of the efforts of the store, mistakes are occasionally made and the wrong account is credited which causes misunderstandings to arise.

In order to eliminate the expenditure of time and labor, and thus the expense, caused by the situation described above, the present invention contemplates and has as its broad objective the provision of a greatly improved statement form having a simple flap or panel attached to the heading section which can be engaged therewith in such a manner as to form a return envelope for the customer after the statement of account section has been detached. Since the heading section necessarily forms one side of this return envelope and bears the customer's name and address as carried on the store's books, positive identification of the account to be credited with the remittance is ensured. Furthermore, experience has proved that the customer will use the return envelope since it saves him the trouble of supplying and addressing his own envelope. Thus, the purpose of the invention is two-fold in that it provides a service to the customer and, what is even more important, provides the store with positive identification of the remitter.

The applicants are aware that various return envelope combinations have been developed heretofore, and have made a careful study of same. However, in practically all of the prior arrangements the envelope is either completely assembled at the time of manufacture, which adds 2 to the bulk and expense of the form, or there are so many flaps and folds and panels that the form is unduly complicated and cumbersome. The structure of the invention, as will be more apparent from the following detailed description, is on the other hand exceedingly simple and another very important object of the invention is to provide a statement form of the above described type which is neither complicated nor cumbersome.

In addition to the broad objectives already noted, another important object of the invention is to provide a statement form of the character described which is relatively inexpensive to produce, the increase in cost over the cost of the widely used two section form being negligible.

A further important object of the invention is to provide a statement form of the character described which is easy for both the store and the customer to use.

A still further important object of the invention is to provide a statement form of the character described which can be used in the conventional manner with any standard size of window envelope.

Still another important object of the invention is to provide a statement form of the character described which can be used with any type of addressograph and bookkeeping machine that is presently available.

Other objects and advantages of the invention will become apparent from the following detailed description thereof read in conjunction with the accompanying drawings which illustrate a representative embodiment of the invention for the purpose of disclosure.

Figure 5:
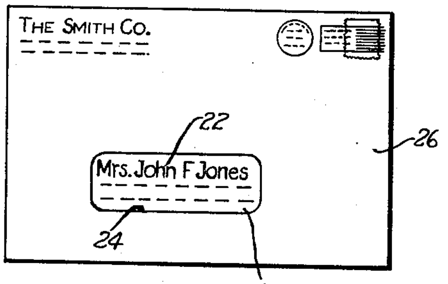
Figure 5 is a front elevation of a standard window envelope with the form positioned therein for original mailing.

Having reference now to the drawings, wherein like reference numbers indicate the same part in each of the views, 10 generally indicates the statement form which is comprised of three panels or sections 12, 14 and 16, the upper and intermediate panels having a common marginal edge defined by an imperforate fold or score line 18 and the intermediate and lower panels having a common marginal edge defined by a weakened tear line 20. The intermediate panel 14 and lower panel 16 correspond in structure and arrangement to the conventional two section forms in widespread use by department stores and the like, panel 14 being the heading or addressee section bearing the customer's name and mailing address and panel 16 being the statement of account section for recording charges, credits and the balance due on the customer's account with the store. The customer's name and address, indicated at 22, are usually applied to the address panel 14 by means of an addressograph while the items on statement panel 16 can be applied by a business machine or the like, the name and address 22 being located in a predetermined position on panel 14 so that they will register with the window 24 of a conventional window envelope 26 when the form is folded and positioned therein for mailing as shown in Figure 5.

Figure 1:
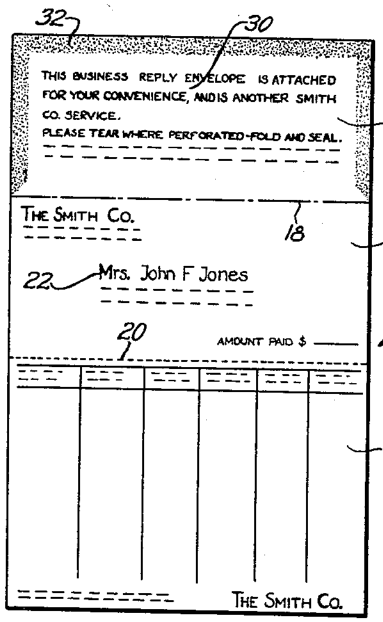
Figure 1 is a front elevation of a statement form embodying the invention.
Figure 2:
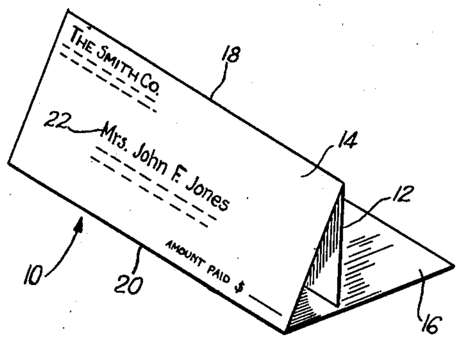
Figure 2 is a front perspective view of the form partially folded for original mailing.
Figure 6:
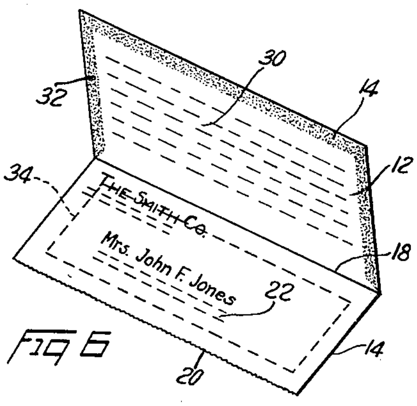
Figure 6 is a front perspective view of the heading section and return address section of the form partially folded for use as a return envelope.
Figure 7:
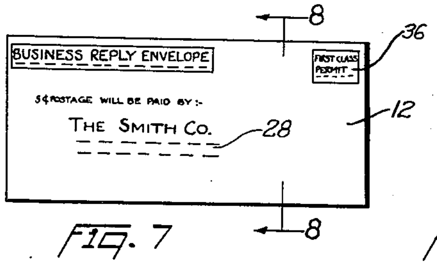
Figure 7 is a front elevation of the completely folded return envelope.

In accordance with the invention, the upper panel 12 is a return address panel and is formed integrally with the addressee panel 14, the fold or score line 18 being the line of demarcation between the two. However, the store's return address, indicated at 28 in Figure 7, is printed on the back side of the form 10 in contrast to the customer's name and address and accounting information which are printed on the front side thereof. On its front side, the return address panel may have suitable explanatory material or directions as to the use of the form as indicated at 30, Figures 1 and 6. As may be best seen in Figure 1, the return address and addressee panels 12 and 14 are of the same size while the statement panel 16 is larger to provide ample room for a number of entries thereon. Adjacent its top and side marginal edges, or in other words, its free edges, the return address panel is provided with a strip of adhesive material 32 which is preferably of the "dry" or water soluble type that must be moistened to use.

Figure 3:
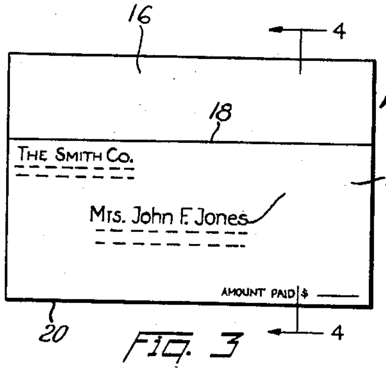
Figure 3 is a front elevation of the form completely folded for original mailing.
Figure 4:
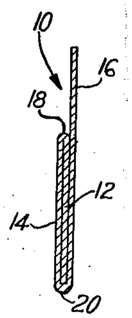
Figure 4 is a vertical transverse section through the folded form taken substantially along line 4—4 of Figure 3.

The forms 10 may be supplied in quantity to the store with everything printed thereon excepting customer's name and address and the accounting items, or if the store has the facilities, it may do all of its own printing. In any case, after the statement has been made out, the form is folded along the fold line 18 and tear line 20 to position the return address panel behind and directly adjacent the addressee panel and the statement panel behind the return address panel. The form will then be folded as shown in Figures 3 and 4, and can be inserted in a standard window envelope 26 with the customer's name and adress in registry with the window 24 thereof.

Figure 8:
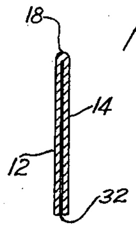
Figure 8 is a vertical transverse section through the return envelope taken substantially along line 8—8 of Figure 7.

When the customer wishes to pay his bill, he detaches the statement panel 16 along the tear line 20 for his own records, and simply re-folds the return address panel 12 on the fold line 18 so that it overlies the addressee panel 14. This positions the store's return address, which was on the back side of the form, on the front of the return envelope and conceals the customer's name and address from view. The customer then places his check or money order, indicated by dash lines at 34 in Figure 6, between the two panels, moistens the adhesive strip 32 and seals the corresponding free edges of the panels together. In this manner, the customer is provided with a simply constructed and easy to use return envelope, Figures 7 and 8, and the latter can be provided with a conventional postal permit 36 which saves the customer postage and further encourages use of the envelope.

From the foregoing description, it will be apparent that the invention described herein provides a greatly improved statement-return envelope combination, which not only affords a service to the customer but ensures quick and accurate crediting of the remittance because the return envelope necessarily includes the addressee panel bearing the customer's name and address exactly as carried on the store's books. In addition, the form is exceedingly simple and economical, having a bare minimum of flaps and folds, and is very easy for both the store and customer to use.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

In combination: a window envelope; and a statement blank used with said window envelope initially comprising a single thickness, rectangular sheet having an imperforate upper return address section, an imperforate intermediate addressee section, and an imperforate lower statement section; the lengths of each of said sections being coextensive with the full width of said sheet; said upper section being joined at its bottom edge to said intermediate section along an imperforate score line; said intermediate section being joined at its bottom edge to said lower section along a weakened tear line whereby the lower section can be readily detached from the other two sections; the widths of said upper and intermediate sections being substantially equal; said upper section having the sender's return address printed on the back of the sheet, said intermediate section having the name and address of the addressee on the front of the sheet, and said lower section having a statement of the addressee's account with the sender on the front of the sheet; said upper and lower sections being folded behind but not secured to said intermediate section when placed in said window envelope for original mailing of said blank to present the name and address of the addressee at the window of said window envelope; and latent activatable adhesive means on the front of the sheet coextensive with the top and side edges of said upper section whereby the upper section can be folded over and adhesively secured to the bottom and side edges of said intermediate section to form a two section return envelope after said lower section has been detached therefrom; said overlying upper section concealing the addressee's name and address on the front of the intermediate section and exposing the sender's name and address to view, whereby said return envelope bears on the inside thereof the addressee's name and address as originally recorded on the blank by the sender so that the user of the return envelope can be positively identified.

References Cited in the file of this patent

UNITED STATES PATENTS

| | | |
|---|---|---|
| 861,747 | Mitchell | July 30, 1907 |
| 1,054,018 | Mitchell | Feb. 25, 1913 |
| 2,396,221 | Yancey | Mar. 5, 1946 |
| 2,773,638 | Krohn | Dec. 11, 1956 |